June 22, 1954

O. C. WINZEN ET AL 2,681,774

FAST RISING BALLOON

Filed June 20, 1951

INVENTOR.
OTTO C. WINZEN
VERA H. WINZEN
BY
Paul, Paul & Moore
ATTORNEYS

June 22, 1954  O. C. WINZEN ET AL  2,681,774
FAST RISING BALLOON

Filed June 20, 1951  3 Sheets-Sheet 2

INVENTOR.
OTTO C. WINZEN
VERA H. WINZEN
BY
ATTORNEYS

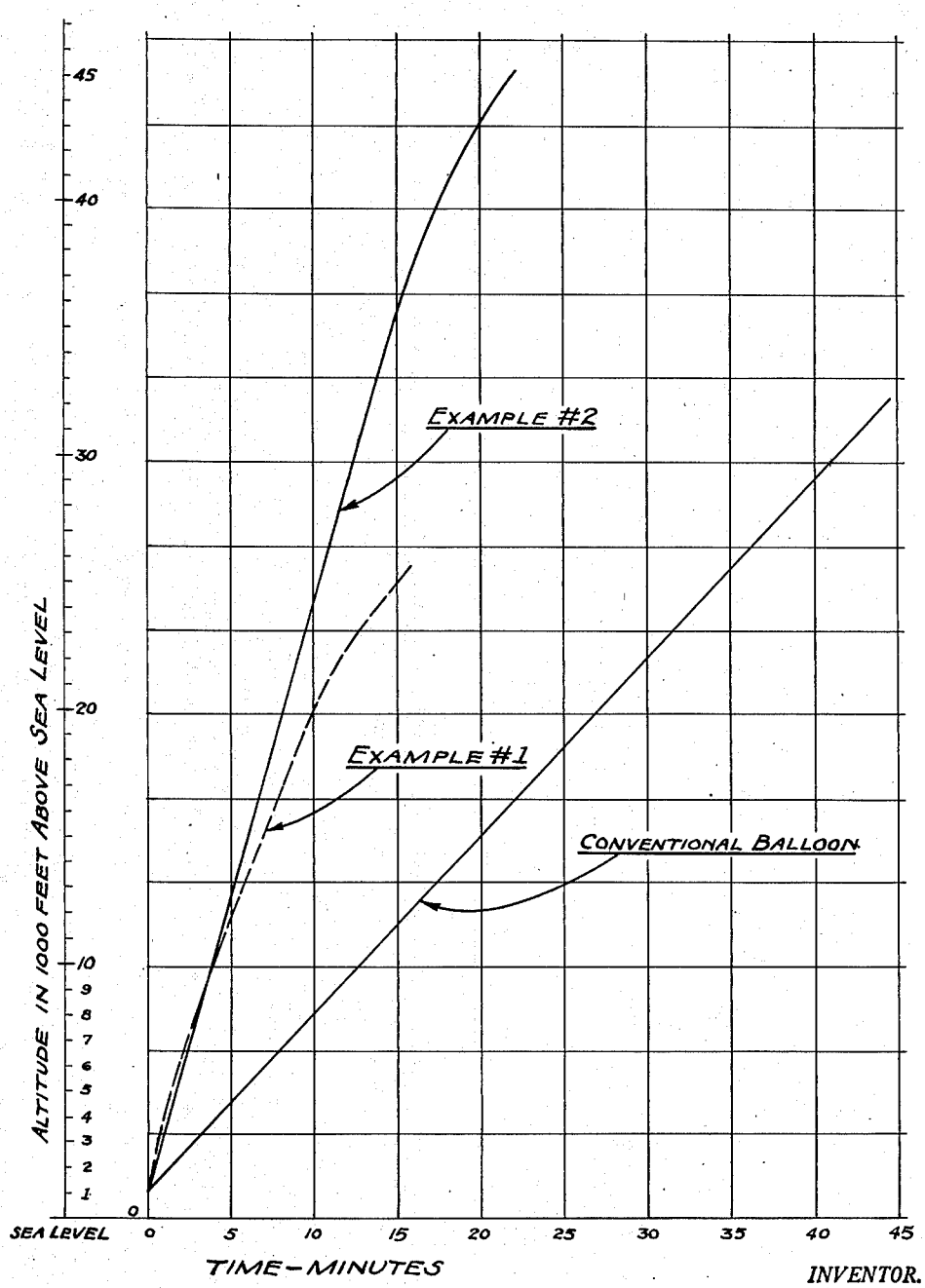

UNITED STATES PATENT OFFICE

2,681,774

FAST RISING BALLOON

Otto C. Winzen and Vera H. Winzen,
Newport, Minn.

Application June 20, 1951, Serial No. 232,598

20 Claims. (Cl. 244—31)

This invention relates to new and useful improvements in balloons and more particularly to new and useful improvements in balloons capable of relatively great ascensional speeds. The invention has particular adaptability in the art of meteorological sounding of upper atmospheric conditions, and is particularly directed to balloons used for such purposes.

Present-day balloons of the type used for sounding flights into the stratosphere for meteorological purposes are usually of a conventional type, which are limited to a relatively slow rate of ascent, viz. approximately 1000 feet per minute or less. The present balloons are constructed of rubber which is extremely difficult to manipulate, particularly when the balloon must be inflated and launched at low temperature. In fact, the conventional rubber balloon must be boiled so as to relieve stress and prevent the balloon from breaking before releasing it for a sounding flight into the stratosphere. It will be remembered that the conventional balloon is constructed as a sphere which is only partly inflated at the time of launching. As such conventional balloons rise, the reduction of atmospheric pressure causes an expansion of the balloon until, at the limit of upward travel, the balloon is fully expanded and then ruptures, the instruments being lowered by parachute. Obviously, such conventional balloons must be very flexible to stand the shape change described, and yet very thin. Accordingly, even the slightest stress may cause failure of the ascension or in the launching and great care must be exercised. In the handling and releasing of such conventional balloons, the balloon must be handled very gently and with extreme care to prevent breaking.

Attempts have been made to increase the lift of conventional rubber meteorological balloons by adding more gas but this results in only a very slight increase in ascensional rate and only to a certain point after which the addition of more gas actually decreases the vertical speed due to increased air resistance and consequent flattening of the top of the essentially spherical balloon shape.

To meet the needs of modern weather analysis a fast rising balloon has long been sought. It is now recognized that stratosphere conditions and circulation have a profound bearing on surface weather. Therefore, it has become increasingly important to reach higher altitudes in meteorological soundings. Present conventional meteorological balloons are capable of reaching the necessary heights but when wind velocities are high the balloon is not infrequently blown out of the range of the radio telemetering equipment before a reading at the high altitude can be obtained. This is true particularly during certain seasons of high upper atmosphere wind and is also particularly true in situations where soundings or samplings of the higher atmosphere or stratosphere are taken from shipboard since the direction of the movement of the ship may be opposite or at right angles to the wind direction at higher altitudes. Since these high level wind velocities often exceed 100 miles per hour and have been recorded as high as 250 miles per hour, it will be seen that in order effectively to monitor and evaluate stratospheric conditions a fast rising balloon is a necessity.

When using conventional meteorological sounding balloons, radio sounding flights consume much time, not only because of the fact that the balloons are slow rising, but because of the fact that the balloon must be handled with great caution during launching, particularly in cold weather when it is necessary to boil the balloon before launching. Hence, radio sounding flights as now practiced consume considerably over an hour and have to be attended by several operators. This is expensive and cumbersome.

Moreover, in the conventional sounding flights as mentioned before, the balloon rises until the cell bursts and then the radio equipment and the remnants of the balloon are lowered by an automatic operating parachute. However, sometimes the parachute does not open as calculated and consequently the radio telemetering equipment is dropped and lost.

In the present invention, no parachute is necessary as the balloon ascends to its maximum elevation and then slowly descends, thus lowering the radiosonde or other payload safely. The balloon of the instant invention does not burst the gas cell as it rises to high altitude but will rise to and then overshoot the calculated ceiling and then settle to earth at a descent rate of about one-half to one-third that of the rate of ascension. Thus, the radio monitoring equipment is lowered to the earth without parachutes and the balloon and the equipment may be recovered and used successive times. This is a feature of the invention and is included in the scope of the hereinafter stated objects.

In wartime and in extensive operations of the armed forces, fast upper atmosphere soundings for wind, temperature, pressure, humidity and cloud-level data are of vital importance. Airplane and guided missile flights, rocket launching and other operations depend on such information. Inasmuch as these conditions in the upper atmosphere are subject to rapid changes, it is essential to obtain data quickly and to use the data at once. This is a further feature of the invention and it is an object of the invention to provide a rapid ascending balloon for so doing.

Prior to the invention and development of the balloon of the instant invention, no balloon has been available which would fulfill these requirements. It is therefore an object of this invention to provide a balloon capable of extremely high rate of ascent or vertical velocity whereby the amount of horizontal travel of the balloon due to the wind is substantially minimized in relation to the amount of vertical travel.

It is also an object of this invention to provide a balloon having a constant or nearly constant differential pressure in relation to the ambient atmosphere and which requires no parachute to control its descent.

It is also an object of this invention to provide a balloon which will not burst upon maximum ascension into the atmosphere but will gradually return to earth intact and which may be used for successive flights.

It is an object of the invention to provide a meteorological instruments carrying balloon which does not require a parachute for recovering the instruments.

It is a further object of this invention to provide a balloon which is utilitarian and which does not require gentle handling or coddling in the launching and operation thereof.

It is also an object of this invention to provide a balloon of novel and unique construction which may be readily manufactured in mass production, is simple to handle in operational use and will materially reduce the time consumed for high altitude meteorological soundings.

It is a further object of this invention to provide a balloon having a plastic material streamlined pressurized gas cell preferably of tapeless construction having a skin stressed design for obtaining the necessary surface rigidity.

It is a further object of this invention to provide a balloon in accordance with my novel streamlined formula.

It is a further object of this invention to provide a balloon having a unique fin structure whereby accurately directed and rapid vertical ascent is assured.

It is a further object of this invention to provide a novel gas escape port means whereby jet propulsion effect thereof will accelerate the vertical ascent of such balloon.

It is a further object of this invention to provide a balloon having rigid fin construction braced against the cell by cord means and novel gas escape port means for maintaining uniform differential pressure and at the same time to provide a jet exhaust for propelling the balloon upwards.

It is a further object of this invention to provide a balloon having a novel calculated configuration designed for ascension at a predetermined rate in excess of 1000 feet per minute.

Other objects of the present invention are those which are apparent and inherent in the apparatus as illustrated, described and claimed.

The invention will be described with reference to the drawings in which corresponding numerals refer to the same parts and in which Figure 1 is a side elevation of the instant invention illustrating a payload such as a radiosonde apparatus attached thereto;

Figure 6 is a graph showing the flight curve of two experimental balloons made in accordance with the instant invention and showing, comparatively, the flight curve of a conventional balloon;

Figure 1:
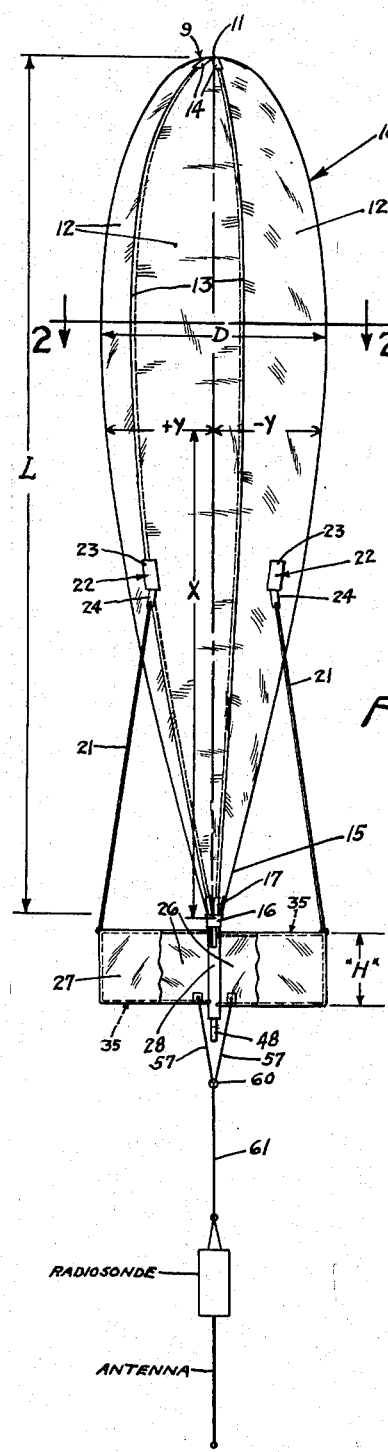
Figure 2:
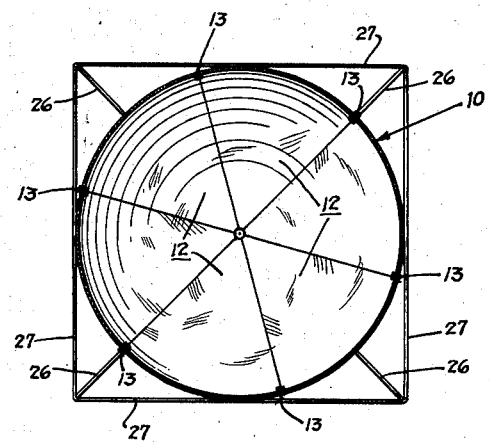
Figure 2 is a sectional plan view taken along the lines 2—2 of Figure 1.
Figure 3:
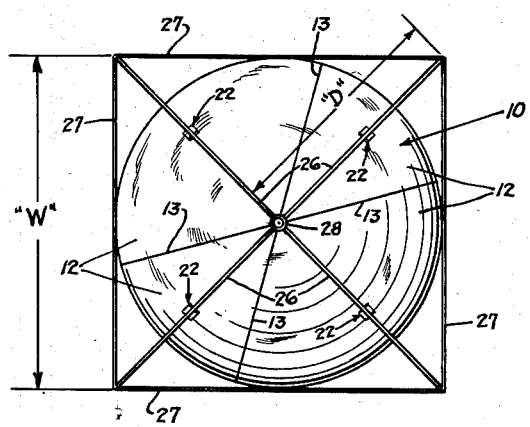
Figure 3 is a bottom plan view of the instant invention.

The invention will be described with reference to the drawings. Referring to Figure 1 particularly, there is illustrated the balloon gas cell generally designated 10.

This gas cell generally designated 10 is comprised of thin plastic material such as polyethylene material, preferably a heat sealing plastic and is of streamlined design having a shape hereinafter more particularly defined. The balloon cell is composed of a plurality (such as six) of identically formed gores 12, which construction is seen best in Figure 1. More or less gores may be used, if desired. Gores 12 are joined together by seams 13. Seams 13 are turned inwardly to the gas cell. The seams are made by heat sealing the adjacent edges of the gores together. The gores 12 terminate at their upper end at apex 11 which is provided with a reinforcing spider 9 composed of polyethylene material adhesively secured or heat sealed to apex 11 over seams 13 and extending downwardly a short distance thereon, as is shown best with reference to Figure 1. Otherwise the seams are not reinforced by tapes. Spider 9 may be an integral unit or may be composed of a plurality of pressure sensitive tapes 14.

Gores 12 are joined together throughout their entire length along seams 13 and terminate at the bottom end of the balloon to form a conical shaped vertex at 15. The conical shaped vertex 15 is not entirely closed but an aperture is provided at the end thereof for the induction of gas into the balloon during inflation and for escape of such gas during flight, as hereinafter described. A plastic reinforcing wristlet 16 is provided which completely encircles the bottom of the conical vertex 15 as is shown best with reference to Figure 5. A plurality of adhesively secured tapes 17 may be disposed from open end 18 of the vertex 15 upwardly along seams 13 as is shown with reference to Figure 1, or they may be omitted as is shown with reference to Figure 5. The plastic wristlet 16 is of the configuration best shown with reference to Figure 5 and serves to give added strength to vertex 15 where it is secured to valve 19 at 29.

The gores 12 of the gas cell 10 are preferably made of thin polyethylene film but other gas-impervious films may be used.

A fin structure for stabilizing and directing the balloon shape while in ascending flight is provided at the trailing end. This may be radial fins or of other fin design. We prefer to use the box fin structure generally designated 20, best shown in Figure 4, but it will be understood that other fin structures may be used. The fin structure 20 is stabilized relative to the balloon by guys 21 usually made of "nylon" rope or cord attached at their upper end to the gas cell 10 by short pieces of pressure sensitive tape 22 having a flat end 23 attached to the gas cell and a fastening end 24 wrapped around the end of guy 21 and attached to the balloon cell wall. The guy ropes 21 are attached to the box frame 20 at end 25. The preferred box fin structure 20 comprises four radial (diagonal) fins 26 and a peripheral box composed of four surfaces 27, which will now be described.

Figure 5:
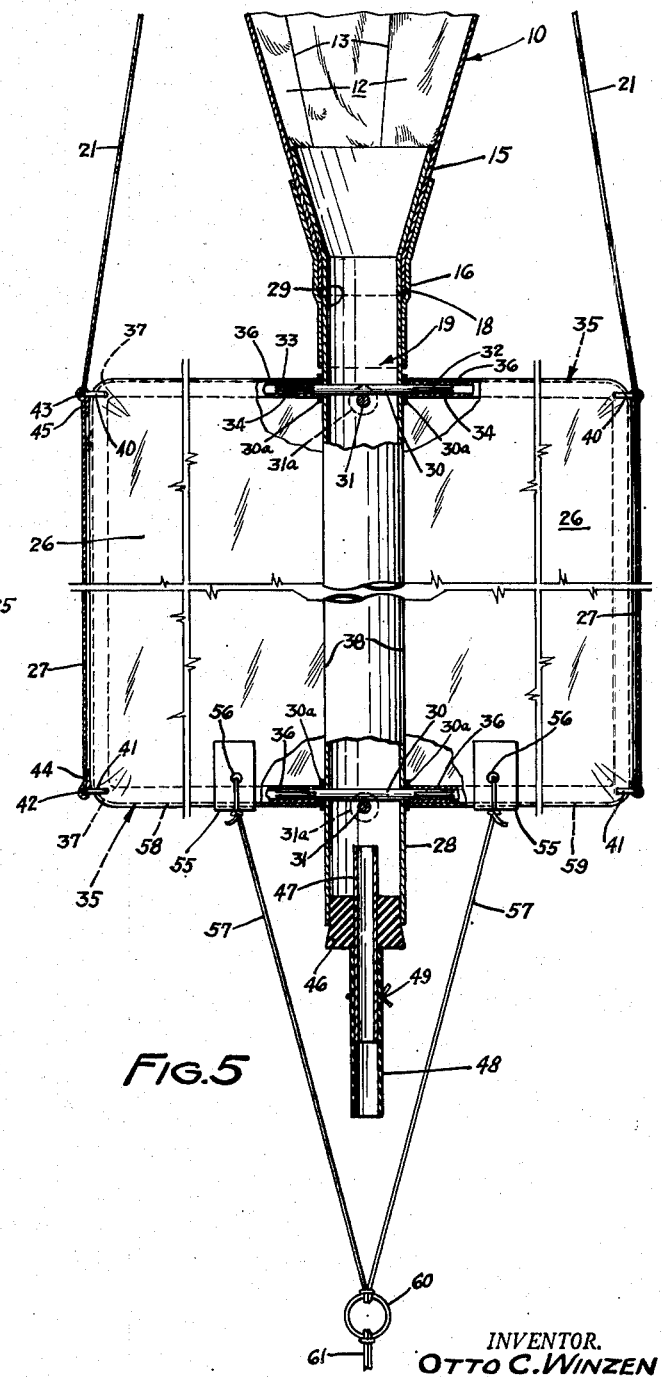
Figure 5 is a fragmentary sectional view enlarged to show the fin arrangement and the novel escape valve structure.

Referring now to Figure 5 the construction of the preferred box fin 20 is shown in breater detail. From the lower (trailing) end of the balloon there extends a tube 28 which also forms a gas escape conduit or "valve." Tube 28 is a hollow tubular member attached in pressure tight relation at 29 to apex 15. Tube 28 is cross drilled with a pair of apertures for the receipt of cross-pins 30 and a pair of apertures for the receipt of cross-pins 31. Cross-pins 31 and 30 extend transversely through the center of tube 28 and have protruding ends 32 and 33 as is shown for pin 30, which are provided with slots 34 therein. Washers of soft rubber or the like material 30a and 31a are provided on pins 30 and 31 where they come through tube 28. These washers serve to resiliently seal pins 30 and 31 to tube 28 and help maintain the pins in position on the tube and also to provide a buffer for the ends of frames 35, and a pressure seal for tube 28. Pins 31 are of similar construction and likewise have sealing washers.

A frame is provided for each one of the radial fin sections 26. This frame comprises a U-shaped member 35 made of thin aluminum or magnesium tubing having the ends 36 thereof press fitted over the slotted ends 32 and 33 of pins 30 and 31 and having the shape shown best in Figure 4. Slightly rounded corners 37 are provided at the top and bottom thereof.

Each of the four radial fins 26 is composed of a thin plastic film, such as a polyethylene film secured upon frame 35 by folding over and heat sealing or by cementing. Each of the fins 26 is provided with a vertical inner edge 38 which abuts against the exterior of tube 28, as is shown in Figure 5. Ends 36 of tubing 35 are so press fitted or crimped at their ends so as releasably to engage the attachment pins 30 and 31 which are preferably slotted for facilitating connecting and disconnecting of the frame.

Figure 4:
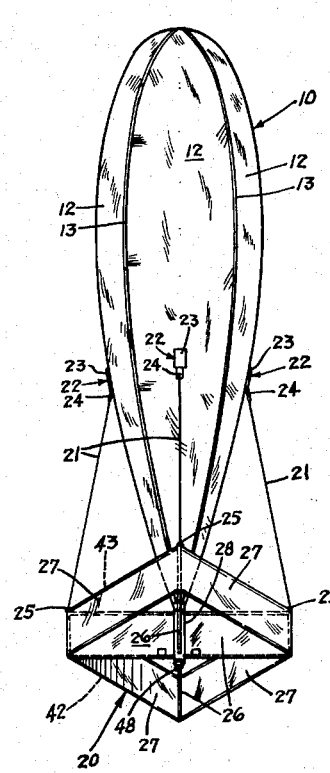
Figure 4 is an isometric view of the invention of Figures 1-3 illustrating the fin construction.

At the curved corners 37 of the U-shaped frames 35 there are provided small attachment rings 40 which are adapted to anchor the sway braces or guide ropes 21 that are fastened to the gas cell by pressure sensitive members 22 as mentioned previously. The function of the guide ropes 21 is to prevent the displacement of the fins during the flight. Rings 40 and 41 are also utilized as anchorages for thin flexible wires 42 and 43 which are secured thereto and strung tight as is indicated in Figure 4 so as to serve as supports for peripheral fins 27. A thin panel of film preferably polyethylene is strung over these thin wires and sealed, sewed or otherwise attached as at 44 and 45 to provide peripheral fins 27. We have found that the peripheral fins 27 may be subjected to some flutter during flight, and we have found that it is sometimes desirable to provide a thicker sheet for panel fins 27 such as laminated "kraft" paper under tension for these fins or to provide reinforcing stays therein. This laminated "kraft" paper under tension may also be used for the radial fins as may other light weight materials without departing from the spirit and scope of this invention.

The gas escape port or "valve" 28 is secured at end 29 to conical apex 15 as mentioned heretofore. It extends from the apex 15 downwardly through the fin structure as illustrated in Figure 5, and serves as a hub for the radial (diagonal) fins structure 26. The bottom end of the gas escape port or "valve" tube 28 is open and is provided with a one holed stopper 46 usually of rubber in which is axaially centered a small light weight (aluminum) exhaust tube 47 having a rubber tube 48 inserted theerover which may be of varying length and secured thereto by a circumferential wire 49 or other means. Tube 48 is adapted to receive one end of a gas supply source and is utilized to join nozzle 47 thereto during filling. Tube 48 is left on the balloon during flight and may be varied in length, being usually about 4 inches overall, and aids in producing the jet nozzle effect as may be seen in Figure 5. This nozzle 57-48, due to the increased inside diameter of 48 as compared with 47, forms an expanding jet nozzle and is of a size and length so as to permit just enough gas to escape to hold the pressure within the balloon envelope to the range of one inch to ten inches of water pressure above the ambient pressure of the air throughout the upward ascension of the balloon. The shape and size (length and cross-sectional area) of the nozzle can be determined experimentally by test or derived by varying the herein specified specific designs or calculated from nozzle formula. This phase of the invention is discussed in greater detail hereinafter. By proper selection of the shape and size of nozzle 47–48, the gas cell will always be maintained under pressure of ½ inch to 10 inches of water, preferably ½ inch to 2 inches greater than ambient, and rigidity of the balloon will therefore be maintained throughout the ascension until after the ceiling altitude is reached and the balloon has overshot its theoretical ceiling the balloon begins a slow descent during which the cell may then partially collapse.

As may best be seen with reference to Figure 5 reinforcing tape sections 55 have apertures 56 therein through which the ends of cord 57 are adapted to be inserted and thereby encircle the bottom extensions 58 and 59 of a pair of oppositely disposed U-shaped members 35 as is best shown with reference to Figure 5. Cord 57 extends downwardly from the balloon as shown in that figure and is attached to ring 60. Ring 60 is attached at the bottom side thereof to cord 61 to which is attached the payload such as a radiosonde or other radio monitoring apparatus or other payload. However, it is to be understood that other means may be devised for attaching the radiosonde thereto without departing from the spirit and scope of this invention.

The gas escape tube or "valve" 47—48 provides a jet exhaust stream of escaping gas which will now escape at a velocity considerably above that of the balloon itself and thereby aid the upward propulsion in much the same manner in which a rocket is propelled. A force equal to 5% or more of the lift of the balloon is thereby provided. The jet of escaping gas also serves to increase the speed of ascent of the balloon by reducing the turbulence in the wake of the balloon as it ascends. In actual practice the launching of the balloon resembles the ascent of a rocket.

The provision of a polygore (here a six gore) cell provides a neat substantially unbroken surface of the gas cell and prevents extreme deformation or wrinkles along the seam as might occur with a substantially lesser number of gores.

The provision of the box or other fin construction connected to the gas cell only by guy wires and not by additional fins provides an efficiently quick ascending balloon design and one which is easy and practical to manufacture. The pressure maintained in the balloon makes it a stiff object during flight.

According to the present invention the balloon is made of streamlined shape. While the art of aerodynamics offers numerous acceptable streamline formulae, we prefer to use a shape generated according to the following formula:

$$Y = \pm \frac{X}{K\sqrt{A}}\sqrt{A-X}$$

in which A is the longitudinal length of the streamline balloon cell, X is a designation of a particular point along the axis of the cell as measured from the sharp end of the cell, and ±Y is the distance of the surface of the balloon cell from such axis, according to Cartesian coordinants. The X and ±Y coordinates are shown in Figure 1. In the formula K is a constant which determines the desired slenderness ratio. We have found that when the constant K is equated to 3 a slenderness ratio of approximately 1 to 4 is produced, and when K equals 1.5 a slenderness ratio of approximately 1 to 2 is produced. Likewise when K equals 4 a slenderness ratio of 1 to 5 of the streamlined body is produced and when K equals 5 a slenderness ratio of 1 to 6.5 is produced. While we have found that the ideal slenderness ratio of a streamlined body with respect to air resistance would be 1 to 6, in practice it has been found desirable to use a somewhat lesser slenderness ratio, and we prefer a slenderness ratio in the range of 1 to 3.5 through 1 to 4.5, such as 1 to 4. This ratio range provides greater gas holding capacity (and hence greater lifting force) while at the same time providing enough transverse stability to resist bending and collapse of the balloon cell. According to this invention the factor K is selected so that the slenderness ratio of diameter to maximum length will be in the range of 1 to 1.5 up to 1 to 6.5, the preferred range being 1 to 3.5 through 1 to 4.5.

The material of the gas cell or bag comprises a gas impervious film such as polyethylene film. The thickness of the film depends upon the differential pressure (above ambient) that is desired to be maintained (½ to 10 inches of water pressure, preferably ½ inch to 2 inches). For a pressure of 1.5 inches of water, we use polyethylene film of 1.5 mills (.0015 inch) thickness. It has been found that polyethylene film of this thickness will support a differential pressure between the gas in the balloon relative to ambient air of 1.5 inches of water pressure. A differential pressure of 1.5 inches of water has been found to be approximately two and one-half times the dynamic pressure impressed upon the frontal area (exterior) of the gas cell by the resistance of the air during the rapid ascent of the balloon and therefore is sufficient to maintain rigidly the streamlined shape of the gas cell during the ascent, which as mentioned heretofore is one of the objects of this invention. The differential pressure between the inside and outside of the balloon should be maintained in the range of ½ inch to 10 inches, preferably ½ inch to 2 inches, of water pressure by appropriate selection of the nozzle shape, size and length of nozzle 47—49.

Turning now to the exhaust or escape orifice by means of which the aforesaid differential pressure is maintained, in the first instances we determined the nozzle size by means of certain assumptions, extensive calculation based on these assumptions and upon extensive experimentation. It was in this way that the shape, length and cross-sectional area of nozzle 47—49 was determined so as to maintain an escape of gas as the balloon rises so that the differential pressure from the inside to the outside of the balloon is maintained in the range of pressures stated. The rate of discharge of gas from the balloon sufficient to keep the differential pressure from the inside of the balloon to the outside atmosphere at approximately a predetermined range of ½ inch to 10 inches of water pressure (preferably at ½ inch to 2 inches water pressure) is determined chiefly by the length and cross-sectional area of the discharge nozzle, 47—49, and to some extent by the shape of the nozzle. If the nozzle 47—49 discharges gas too readily, an insufficient pressure differential (as compared to outside ambient pressure) will be maintained and the balloon will dent and collapse due to the frontal (dynamic) pressure due to its rapid rate of rise. If the nozzle 47—49 discharges gas too slowly, there is danger that the balloon cell will rupture. The rate of discharge can be varied by changing the shape, length or cross section (or all three) of the nozzle 47—49 until, upon trial, the balloon cell maintains its shape as it rises. In the first instances, we determined the nozzle size by calculation and experiment. Because of the larger number of inter-related variables involved, it is usually easiest, for any new design, to work from one of the known designs given herein. Several designs are specified.

By way of explanation, it is noted that almost every factor of the balloon design is inter-related and the problem is almost insoluble upon a purely mathematical basis. Thus, the streamline shape and slenderness ratio and rate of rise determine the frontal pressure upon the balloon as it rises, and rate of rise determines the rate of decrease of ambient pressure which must be followed (in like relation) by rate of decrease of internal pressure. The whole problem is effected by the load carried. Even with an assumed constant differential pressure, the calculation of nozzle shape and dimensions for a specified rate of discharge is difficult, and is all the more so here where the rate of rise must be assumed. Hence, it is easiest and quickest simply to work from the designs herein given (which have been tested successfully) or in any specific design by selecting and testing various nozzles until the desired size may be found.

Figure 7:
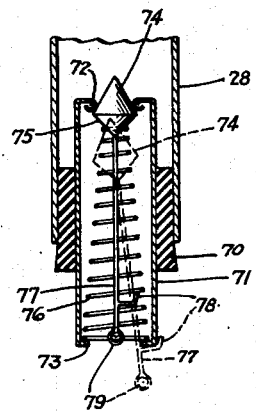
Figure 7 is a vertical sectional view showing a pressure relief valve which may optionally be used.

In Figure 7 there is illustrated a form of pressure relief valve which may, if desired, be substituted for the "valve" 47—48 of Figure 5. In Figure 7, the stopper 70 in tube 28 is apertured to receive a tubular member 71 which is beaded over at 72 to form a seat for valve member 74. Member 74 has a face 75 and a stem 77 terminating in eye 79. Springs 76 resting on flange 73 bears against under face 75 thus normally holding member 74 in the closed position shown in full lines. The stem 77 has a side hook 78, and when stem is pulled down and hook 78 placed over flange 73, the valve is held open for inflating the balloon. The projected area of valve member 74 is sufficiently large so that when the pressure within the balloon increases beyond the maximum for which a particular balloon is designed, the valve member 74 will be forced down out of engagement with seat 72, thus relieving and holding constant the pressure within the balloon cell. Spring 76 normally holds member 74 against seat 72 and can be of a stiffness such that any desired pressure is maintained within the balloon cell. The use of the Figure 7 construction avoids necessity for precise selection of sizes for the valve 47—48 as shown in Figure 5.

We have discovered further that orifices 47—48 of Figure 5 or the valve of Figure 7 should be of a size and construction such that they will discharge from .01 to .10 cubic foot of gas per minute per cubic foot of balloon volume for pressures within the balloon in the stated range of 1 inch to 10 inches water pressure above ambient.

Two specific examples for the pertinent data for the balloon on this invention are as follows:

*Example 1*

Length, 20 ft.
Maximum diameter, 5 ft.
Slenderness ratio, 4 to 1.
K=3.
Volume calculated=235 cubic ft.
Volume actual (due to stretch of skin)=260 cubic ft.
Bag material, approx., 1.5 mil. or .0015 inch polyethylene film.
Gores, 6.
Weight of balloon and payload, 7 pounds, approx.
Gas used, hydrogen.
Stabilizing fins:
 Diagonals "D"=41 inches.
 Width "W"=60 inches.
 Height "H"=20 inches.
Jet tube (aluminum), $\frac{5}{16}$ inch inside diameter by 3 inches long.
Rubber extension on nozzle, 4 inches.
Rate of rise, average, 1630 ft. per minute.
Ceiling, 26,000 ft.

*Example 2*

Length, 21 ft.
Maximum diameter, 5.5 ft.
K=3.
Slenderness ratio, 3.6 to 1.
Volume, calculated, 320 cubic ft.
Volume, actual (due to stretch of skin), 360 cubic ft.
Bag material, approx., 1.5 mil. thick or .0015 inch, polyethylene film.
Gores, 6.
Weight of balloon and payload, 7½ pounds, approximately.
Gas used, hydrogen.
Stabilizing fins:
 Diagonal "D"=51 inches.
 Width "W"=72 inches.
 Height "H"=25 inches.
Jet tube (aluminum), 0.340 inch inside diameter by 3 inches long.
Rubber extension, 4 inches.
Rate of rise, average, 2400 ft. per minute to 35,000 ft.
Ceiling, 45,000 ft per minute.

The examples must not be considered as limitations upon the invention.

As shown by the Examples 1 and 2 and as graphically illustrated in Figure 6, the balloon of the instant invention has performance characteristics materially superior to those of the presently available balloons. Thus, in Figure 6 the conventional meteorological balloon rose to 30,000 feet in approximately 41 minutes, or a rate of rise of 730 feet per minute, whereas the balloon of Example 1 rose to 25,000 ft. in 15 minutes or a rate of rise of 1670 feet per minute, and the balloon of Example 2 rose to 43,000 feet in 20 minutes or a rate of rise of 2150 feet per minute. In addition, each balloon (Example 1) and Example 2) then settled back to earth at about ⅓ to ½ the rate of ascent, meanwhile recording its whereabouts by means of the radiosonde, and each balloon was recovered.

As used herein, the term "slenderness ratio" is the ratio of maximum diameter of the balloon cell (dimension D) to the length (dimension L), see Figure 1. Also, as used herein the term "differential pressure" means the difference in pressure from inside the balloon to outside of the balloon.

As many apparently widely different embodiments of this invention may be made without departing from the spirit and scope thereof, it is to be understood that we do not limit ourselves to the specific embodiments herein.

What we claim is:

1. A fast rising pressurized balloon comprising a streamlined shaped envelope having a relatively blunt upper forward end and a slender trailing lower end, and rigidly attached stabilizing surfaces adjacent said trailing end, said balloon having a gas escape valve at the trailing end thereof, said valve comprising an elongated tubular member having its longitudinal axis aligned with that of said balloon, one end of said tubular member being connected to the trailing end of said balloon and adapted to permit the flow of gas from said balloon into said tubular member, a closure portion secured to the other end of said tubular member, said closure portion being provided with an opening aligned with the longitudinal axis of said balloon, a second tubular member secured to said closure portion within the opening therein, and having its longitudinal axis aligned with that of said balloon, one end of said second named tubular member being in communication with the interior of said first named tubular member and the other end thereof being open to the atmosphere to permit the flow of gas from said balloon in metered amounts whereby the gas pressure in the balloon is maintained in the range of ½ to 10 inches of water pressure greater than ambient pressure during the rising balloon flight.

2. A fast rising pressurized balloon comprising a streamlined shaped envelope having a relatively blunt upper forward end and a slender trailing lower end and a slenderness ratio range of 1 to 1.5 through 1 to 6.5 and provided adjacent its trailing end with rigidly attached stabilizing surfaces, said balloon having a gas escape valve at the trailing end thereof, said valve comprising an elongated tubular member having its longitudinal axis aligned with that of said balloon, one end of said tubular member being connected to the trailing end of said balloon and adapted to permit the flow of gas from said balloon into said tubular member, a closure portion secured to the other end of said tubular member, said closure portion being provided with an opening aligned with the longitudinal axis of said balloon, a second tubular member secured to said closure portion within the opening therein and having its longitudinal axis aligned with that of said balloon, one end of said second named tubular member being in communication with the interior of said first named tubular member and the other end thereof being open to the atmosphere to permit the flow of gas from said balloon in metered amounts whereby the gas pressure in the balloon is maintained in excess of ambient pressure during ascent of the balloon.

3. A fast rising pressurized balloon comprising a streamlined shaped envelope having a relatively blunt upper forward end and a slender trailing lower end and a slenderness ratio range of 1 to 1.5 through 1 to 6.5 and provided adjacent its trailing end with rigidly attached stabilizing surfaces, said balloon having a gas escape valve at the trailing end thereof, said valve comprising an elongated tubular member having its longitudinal axis aligned with that of said balloon, one end of said tubular member being connected to the trailing end of said balloon and adapted to permit the flow of gas from said balloon into said tubular member, a closure portion secured to the other end of said tubular member, said closure portion being provided with an opening aligned with the longitudinal axis of said balloon, a second tubular member secured to said closure portion within the opening therein and having its longitudinal axis aligned with that of said balloon, one end of said second named tubular member being in communication with the interior of said first named tubular member and the other end thereof being open to the atmosphere to permit the flow of gas from said balloon in metered amounts whereby the gas pressure in the balloon is maintained in excess of ambient pressure during ascent of the balloon.

4. A fast rising pressurized balloon comprising a streamlined shaped envelope having a relatively blunt upper forward end and a slender trailing lower end and a slenderness ratio range of 1 to 3.5 through 1 to 4.5 and provided adjacent its trailing end with rigidly attached stabilizing surfaces, said balloon having a gas escape valve at the trailing end thereof, said valve comprising an elongated tubular member having its longitudinal axis aligned with that of said balloon, one end of said tubular member being connected to the trailing end of said balloon and adapted to permit the flow of gas from said balloon into said tubular member, a closure portion secured to the other end of said tubular member, said closure portion being provided with an opening aligned with the longitudinal axis of said balloon, a second tubular member secured to said closure portion within the opening therein and having its longitudinal axis aligned with that of said balloon, one end of said second named tubular member being in communication with the interior of said first named tubular member and the other end thereof being open to the atmosphere to permit the flow of gas from said balloon in metered amounts whereby the gas pressure in the balloon is maintained at a substantially uniform value in excess of ambient pressure during ascent of the balloon.

5. A fast rising pressurized balloon comprising a streamlined shaped envelope having a relatively blunt upper forward end and a slender trailing lower end and a slenderness ratio of about 1 to 4, and provided adjacent its trailing end with rigidly attached stabilizing surfaces, said balloon having a gas escape valve at the trailing end thereof, said valve comprising an elongated tubular member having its longitudinal axis aligned with that of said balloon, one end of said tubular member being connected to the trailing end of said balloon and adapted to permit the flow of gas from said balloon into said tubular member, a closure portion secured to the other end of said tubular member, said closure portion being provided with an opening aligned with the longitudinal axis of said balloon, a second tubular member secured to said closure portion within the opening therein and having its longitudinal axis aligned with that of said balloon, one end of said second named tubular member being in communication with the interior of said first named tubular member and the other end thereof being open to the atmosphere to permit the flow of gas from said balloon in metered amounts whereby the gas pressure in the balloon is maintained at a substantially uniform value in excess of ambient pressure during ascent of the balloon.

6. A fast rising pressurized balloon comprising a streamlined shaped envelope having a relatively blunt upper forward end and a slender trailing lower end and a slenderness ratio of 1 to 1.5 through 1 to 6.5 provided adjacent its trailing end with rigidly attached stabilizing surfaces, said balloon having a gas escape valve at the trailing end thereof, said valve comprising an elongated tubular member having its longitudinal axis aligned with that of said balloon, said tubular member having a free end and an end connected to the trailing end of said balloon and adapted to permit the flow of gas from said balloon into said tubular member, a resilient tube having one end thereof slidably connected to the free end of said tubular member and the other end thereof open to the atmosphere to permit the flow of gas from said balloon, said resilient tube having a longitudinal axis aligned with that of said balloon, and means for securing said resilient tube at a predetermined point on said tubular member to vary the effective length of said resilient tube depending from the free end of said tubular member, whereby gas is released from said balloon at a discharge rate of from .01 to .10 cubic foot of gas per minute per cubic foot of balloon volume at a differential pressure of ½ to 10 inches of water pressure.

7. A fast rising pressurized balloon comprising a streamlined shaped envelope having a relatively blunt upper forward end and a slender trailing lower end and a slenderness ratio of 1 to 3.5 through 1 to 4.5 provided adjacent its trailing end with rigidly attached stabilizing surfaces, said balloon having a gas escape valve at the trailing end thereof, said valve comprising an elongated tubular member having its longitudinal axis aligned with that of said balloon, said tubular member having a free end and an end connected to the trailing end of said balloon and adapted to permit the flow of gas from said balloon into said tubular member, a resilient tube having one end thereof slidably connected to the free end of said tubular member and the other end thereof open to the atmosphere to permit the flow of gas from said balloon, said resilient tube having a longitudinal axis aligned with that of said balloon, and means for securing said resilient tube at a predetermined point on said tubular member to vary the effective length of said resilient tube depending from the free end of said tubular member, whereby gas is released from said balloon at a discharge rate of from .01 to .10 cubic foot of gas per minute per cubic foot of balloon volume when the pressure of the balloon above ambient is in the range of ½ to 10 inches of water pressure.

8. A fast rising pressurized balloon comprising a streamlined shaped envelope having a relatively blunt upper forward end and a slender trailing lower end and provided adjacent its trailing end with rigidly attached stabilizing surfaces, said balloon having a gas escape valve at the trailing end thereof, said valve comprising an elongated tubular member having its longitudinal axis aligned with that of said balloon, said tubular member having a free end and an end connected to the trailing end of said balloon and adapted to permit the flow of gas from said balloon into said tubular member, a resilient tube having one end thereof slidably connected to the free end of said tubular member and the other end thereof open to the atmosphere to permit the flow of gas from said balloon, said resilient tube having a longitudinal axis aligned with that of said balloon, and means for securing said resilient tube at a predetermined point on said tubular member to vary the effective length of said resilient tube depending from the free end of said tubular member whereby the gas pressure in the balloon is maintained at approximately one and one-half inches of water pressure greater than ambient pressure during the rising balloon flight.

9. A fast rising pressurized balloon comprising a streamlined shaped envelope having a relatively blunt upper forward end and a slender trailing lower end and a slenderness ratio of approximately 1 to 4, provided adjacent its trailing end with rigidly attached stabilizing surfaces, said balloon having a gas escape valve at the trailing end thereof, said valve comprising an elongated tubular member having its longitudinal axis aligned with that of said balloon, said tubular member having a free end and an end connected to the trailing end of said balloon and adapted to permit the flow of gas from said balloon into said tubular member, a resilient tube having one end thereof slidably connected to the free end of said tubular member and the other end thereof open to the atmosphere to permit the flow of gas from said balloon, said resilient tube having a longitudinal axis aligned with that of said balloon, and means for securing said resilient tube at a predetermined point on said tubular member to vary the effective length of said resilient tube depending from the free end of said tubular member, whereby gas is released from said balloon at a discharge rate of from .01 to .10 cubic foot of gas per minute per cubic foot of balloon volume as the balloon rises.

10. A fast rising pressurized balloon comprising a streamlined shaped envelope having a relatively blunt upper forward end and a slender trailing lower end, said balloon provided adjacent its trailing end with rigidly attached stabilizing surfaces, said balloon having a jet orifice at the trailing end aligned with the longitudinal axis of the balloon, said streamlined shape being of such a configuration that when a plane is passed through the longitudinal axis of the balloon in any direction a curve is formed according to the following equation:

$$Y = \pm \frac{X}{K\sqrt{A}}\sqrt{A-X}$$

wherein A is the overall length of the balloon, X is the designation of a particular point along the axis of the envelope, and ±Y is the distance from such point to the surface of the balloon, and K is a constant in the range of 1.5 through 5.

11. The article of claim 10 further characterized in that the constant K is in the range of 3 to 4.

12. The article of claim 11 further characterized in that A equals approximately 21 feet.

13. The article of claim 11 further characterized in that the said envelope is composed of six or more gores of plastic material.

14. A fast rising pressurized balloon comprising a streamlined shaped envelope having a relatively blunt upper forward end and slender trailing end and rigidly attached stabilizing surfaces, said balloon having a longitudinally extending tubular member on the trailing end thereof aligned with the longitudinal axis of the balloon, said longitudinal member being further characterized in that it has a jet orifice at the trailing end thereof for maintaining the gas pressure in the balloon in the range of 1 to 2 inches of water pressure greater than ambient pressure during the rising balloon flight, and said streamline shape is of such configuration that when a plane is passed through the longitudinal axis of the balloon in any direction a curve is formed according to the following equation:

$$Y = \pm \frac{X}{K\sqrt{A}}\sqrt{A-X}$$

in which A is the overall length of the balloon, X is a point along the longitudinal axis of the balloon and ±Y is the distance from such point to the balloon surface measured normal to said axes, and K is a constant for determining the slenderness ratio of the balloon.

15. A fast rising pressurized balloon comprising a streamlined shaped envelope having a relatively blunt upper forward end and slender trailing end and rigidly attached stabilizing surfaces, said balloon having a longitudinally extending tubular member on the trailing end thereof aligned with the longitudinal axis of the balloon, said longitudinal member being further characterized in that it has a jet orifice at the trailing end thereof for maintaining the gas pressure in the balloon in the range of 1 to 2 inches of water pressure greater than ambient pressure during the rising balloon flight, and a plurality of radially extending stabilizing surfaces attached to said longitudinal member.

16. A fast rising pressurized balloon comprising a streamlined shaped envelope having a relatively blunt upper forward end and slender trailing end and rigidly attached stabilizing surfaces, said balloon having a longitudinally extending tubular member on the trailing end thereof aligned with the longitudinal axis of the balloon, said longitudinal member being further characterized in that it has a jet orifice at the trailing end thereof for maintaining the gas pressure in the balloon in the range of 1 to 2 inches of water pressure greater than ambient pressure during the rising balloon flight, a plurality of radially extending stabilizing surfaces attached to said longitudinal member, and a peripheral stabilizing surface forming a perimeter around the ends of said radially extending stabilizing surfaces.

17. The article of claim 16 further characterized in that said stabilizing surfaces are guyed to said streamlined shaped envelope.

18. A fast rising pressurized balloon comprising a streamlined shaped envelope of at least six gores and composed of a plastic skin, said streamlined shaped envelope having a relatively blunt upper forward end and a slender trailing lower end, rigidly attached stabilized surfaces provided on said envelope adjacent said trailing end, said rigidly attached stabilizing surfaces comprising a plurality of radial extending stabilizing surfaces and a peripheral stabilizing surface forming a perimeter therefor, said balloon having a tubular member at the trailing end thereof providing a mounting for the inner end of said radial stabilizing surfaces, said tubular member having an orifice at the trailing end thereof aligned with the longitudinal axis of the balloon, and of a size to maintain the gas pressure in the balloon at approximately ½ to 2 inches of water pressure greater than the ambient during the rising balloon flight, said streamlined shaped envelope being of such configuration such that when a plane is passed through the longitudinal axis of the balloon in any direction a curve is formed substantially according to the following equation:

$$Y = \pm \frac{X}{K\sqrt{A}}\sqrt{A-X}$$

wherein A is the overall length of the balloon, X is a point along the axis of the balloon and ±Y is the distance from said axis to the balloon surface, measured in a direction normal to said axis, and K is a constant providing the slenderness ratio of the balloon, said constant K being in the range of 1.5 to 5.

19. A fast rising pressurized balloon comprising in combination a streamlined shaped envelope having a relatively blunt forward end and a slender trailing lower end, rigidly attached stabilized surfaces adjacent said balloon, said balloon having a first longitudinally extending tubular member on the trailing end thereof along the longitudinal axis of the balloon, a second tubular member of substantially smaller diameter positioned to extend from the exterior end of said first tubular member and providing a restricted jet orifice, said first and second tubular members being relatively inflexible and a third flexible tubular member positioned over the extended end of said restricted jet orifice and extending therefrom.

20. A fast rising pressurized balloon comprising a streamlined shaped envelope having a relatively blunt upper forward end and a slender trailing lower end, said streamlined shape being of such a configuration that when a plane is passed through the longitudinal axis of the balloon in any direction a curve is formed according to the following equation:

$$Y = \pm \frac{X}{K\sqrt{A}}\sqrt{A-X}$$

wherein A is the overall length of the balloon, X is the designation of a particular point along the axis of the envelope, and ±Y is the distance from such point to the surface of the balloon, and K is a constant in the range of 1.5 through 5.

References Cited in the file of this patent

UNITED STATES PATENTS

| Number | Name | Date |
|---|---|---|
| 721,051 | King | Feb. 17, 1903 |
| 2,492,800 | Isom | Dec. 27, 1949 |
| 2,526,719 | Winzen | Oct. 24, 1950 |

FOREIGN PATENTS

| Number | Country | Date |
|---|---|---|
| 562,091 | Germany | Oct. 21, 1931 |